W. A. Ives,

Auger.

No. 4,156. Reissued Oct. 18. 1870.

Witnesses

A. J. Tibbets

J. H. Shumway

William A. Ives

Inventor

By his Attorney,

Wm. E. Earle

N. PETERS, PHOTO-LITHOGRAPHER, WASHINGTON, D. C.

United States Patent Office.

WILLIAM A. IVES, OF NEW HAVEN, CONNECTICUT.

Letters Patent No. 95,803, dated October 12, 1869; reissue No. 4,156, dated October 18, 1870.

IMPROVEMENT IN AUGERS.

The Schedule referred to in these Letters Patent and making part of the same.

*To all whom it may concern:*

Be it known that I, WILLIAM A. IVES, of New Haven, in the county of New Haven and State of Connecticut, have invented a new Improvement in Augers; and I do hereby declare the following, when taken in connection with the accompanying drawing and the letters of reference marked thereon, to be a full, clear, and exact description of the same, and which said drawing constitutes part of this specification, and represents in—

Figure 1:
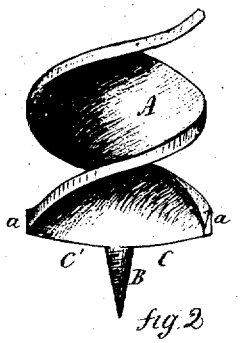
Figure 2:
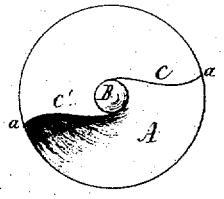

Figure 1, a side view of the cutting-end of the auger, looking toward the edge of one of the cutters, and, in Figure 2, an end view of the auger.

This invention relates to an improvement in auger-bits, the object being to combine a curved gouge floor-lip with a vertical cutter upon its extreme end.

A is the twist of a common auger;

B, the screw-point;

C, the floor-lip upon one side; and

C′, a corresponding floor-lip upon the opposite side.

These floor-lips are curved up from the center, gouge-shaped, so that the cut commences at the center, working outward, thus dispensing with the use of the spur-cutters.

I combine with these gouge-shaped floor-lips, respectively, a perpendicular or side cutter, *a*, rising from the floor-lips at their extreme ends, and the said gouge-shaped floor-lips are curved upon the edge, as seen in fig. 2.

These, so soon as the floor-cutters have entered the wood, serve to trim off and gather the chips, and prevent the binding or clogging of the cutters, whereby the auger works much easier than the gouge-lip as heretofore constructed.

I do not wish to be understood as broadly claiming a gouge-lip auger, as such, I am aware, is not new; but What I do claim as my invention, and desire to secure by Letters Patent, is—

In auger-bits, the combination of the curved edge gouge-shaped floor-lips C C′, with their respective side or vertical cutters *a a*, connected and arranged substantially as shown and described.

W. A. IVES.

Witnesses:

A. J. TIBBITS,

J. H. SHUMWAY.